Oct. 13, 1970     D. G. EAST ET AL     3,534,380
OSCILLOGRAPH RECORDING APPARATUS AND METHOD
Filed Nov. 1, 1968     2 Sheets-Sheet 1
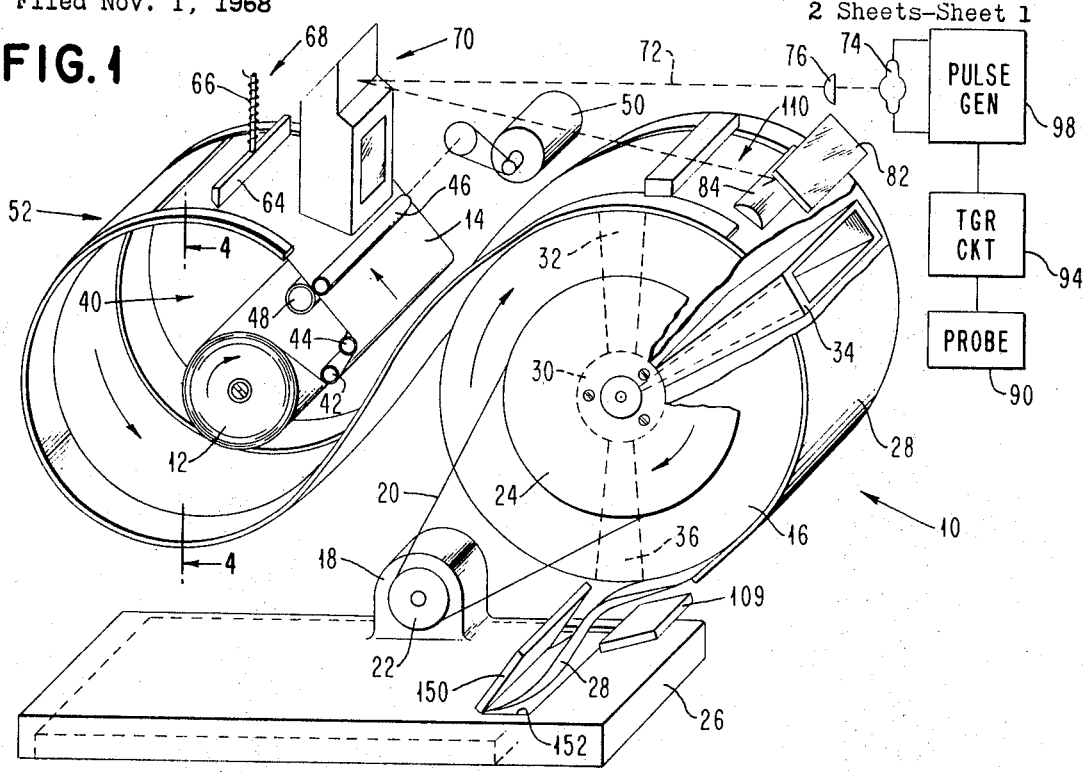
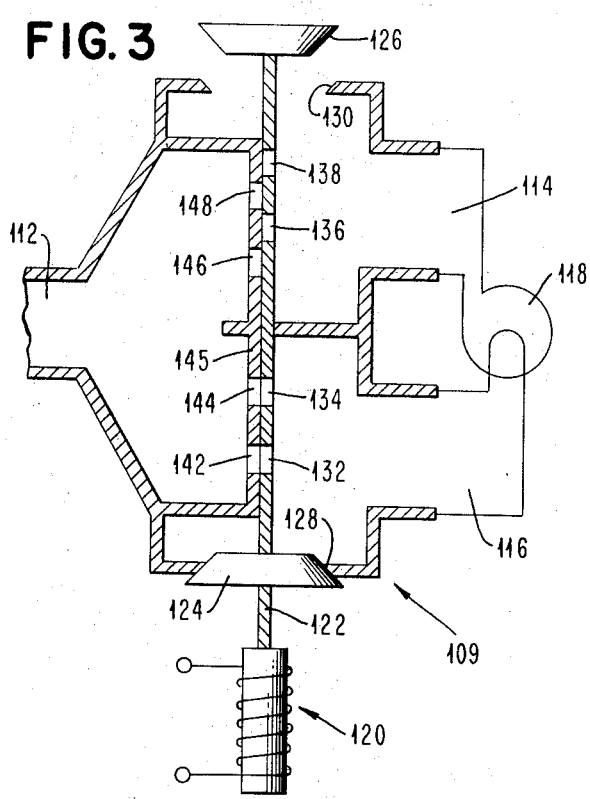
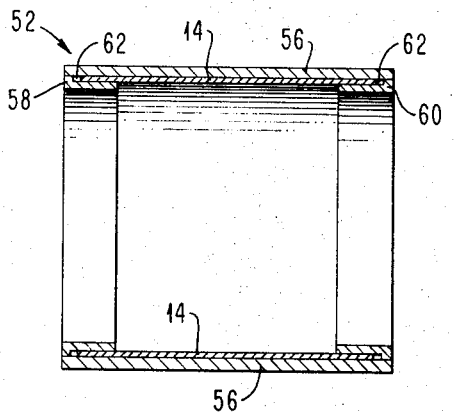
INVENTORS
DON G. EAST
PHILIP A. HERMAN
DENNIS H. KEKAS
BY *A. Sidney Alpert*
ATTORNEY 3,534,380
OSCILLOGRAPH RECORDING APPARATUS
AND METHOD
Don G. East and Philip A. Herman, Poughkeepsie, N.Y.,
and Dennis H. Kekas, Raleigh, N.C., assignors to International Business Machines Corporation, Armonk,
N.Y., a corporation of New York
Filed Nov. 1, 1968, Ser. No. 772,675
Int. Cl. G01r 13/06, 13/14
U.S. Cl. 346—22                                    7 Claims

ABSTRACT OF THE DISCLOSURE

A direct writing automatic oscillograph is disclosed, that is able to monitor power systems in order to record low frequency transients or disturbances occurring thereon. A single piece of recording paper is mounted on a continuously rotating pneumatic drum. When a transient condition is detected, a lamp is rapidly energized by a lamp starting circuit, and a galvanometer reflects the light onto the paper. After one revolution of the drum, the paper is discharged into a hopper and another single piece of recording paper is loaded onto the drum.

BACKGROUND OF THE INVENTION

The present invention relates generally to the field of oscillograph recording apparatus and methods, and more particularly to improved apparatus and methods for monitoring transitory electrical power line disturbances.

Many industries have been concerned by the failure of power utility companies to adequately control power line disturbances. However, momentary power line disturbances or transients are commonplace on power systems as they result from such phenomena as lightning strikes, power factor capacitor switching and load changes. Accordingly, the utility companies cannot actually be expected to control power line transients, and it is up to the users or customers themselves to take corrective action.

Th modern computer is one voltage-sensitive device that is extremely susceptible to low frequency power line transients or disturbances: i.e., disturbances ranging from less than one to more than twenty-five power line cycles. A voltage wave form at the input to a computer can include complex combinations of surges and dips, with durations ranging from approximately 1 millisecond to a number of power line cycles. Since such power line disturbances may cause computer error, it is desirable to have equipment and methods for monitoring the power lines during operation to pinpoint such errors. Further, it is desirable to have equipment that will aid in the rapid and accurate analysis of either actual or simulated power line disturbances in order to enable improved computer designs. However, present instrumentation and techniques are limited in various respects, and are not able to provide an accurate assessment of power line disturbances.

The equipment available in the prior art, within present knowledge, will not accurately record randomly occurring power line disturbances of present concern; i.e., disturbances having durations of six cycles or less. In this regard, known prior art equipment requires auxiliary undisturbed operating power and generally uses expensive delay lines or magnetic traps to permit sufficient starting time for a conventional oscillograph to record a wave form. Besides the expense involved, such techniques present such drawbacks as signal degradation, excessive bulk and the requirement for frequent calibration. Furthermore, prior art oscillogaph recording equipment generally requires a large paper supply, and does not provide fast copies, necessitating the sorting through a whole roll of paper to find any particular occurrence of a power line disturbance.

Accordingly, it is a general object of the present invention to provide apparatus for monitoring power line disturbances or the like that overcomes the deficiencies of the prior art devices and methods.

It is another object of the present invention to provide improved apparatus and methods for detecting and recording extremely short duration variations in wave form.

A further object of the present invention resides in the provision of oscillograph recording apparatus that is capable of providing fast, accurate and readily available records upon detection of a disturbance in a monitored power system.

SUMMARY OF THE INVENTION

Briefly, the apparatus of the present invention includes a rotating pneumatic drum that carries a discrete or single piece or strip of light-sensitive oscillograph paper. The light-sensitive paper is held in place on the drum by vacuum and, under normal conditions, i.e., no transient voltage detection, the drum rotates and the paper is not exposed to light. Immediately adjacent the drum, a paper feed loading chute is prepared to receive a second sheet of the paper, as yet uncut from a continuous supply roll of paper contained within a paper feed assembly. One or more oscillograph galvanometers of the light beam type, in a data recording assembly, continuously respond to monitored input, but a recording is not produced because no illumination is provided.

When a disturbance occurs, a trigger circuit detects the start of the disturbance and, together with a pulse generating circuit, rapidly turns on a high-intensity light source and permits the light source to remain on for one revolution of the drum. The light is directed by the galvanometers onto the paper, photographically recording the monitored wave form. Upon completing the recording, the pneumatic drum is pressurized by a paper eject mechanism. The period of pressurization is properly timed to remove the exposed paper from the drum and to insure its travel into a storage hopper or chute. Operation of the apparatus subsequent to triggering and through ejection of the completed recording is made independent of power line conditions by utilizing mechanical and electrical energy storing elements within the apparatus. As the paper is ejected, a paper loading mechanism feeds unexposed paper into the loading chute and severs it from the continuous supply roll. Restoration of partial vacuum to the drum then causes this new sheet of paper to be grasped by and wrapped about the drum. This places the recording apparatus in restored or ready-to-record condition.

The above apparatus is quite simple in operation, and yet provides an extremely accurate representation of the transient wave form. Thus, rapid actuation of the light source permits the recording of the important leading edge of the disturbance without resort to costly and cumbersome delay recording techniques. Furthermore, amplification is not required in the logical control of galvanometer circuitry as in delay techniques, and there is therefore no concern of saturating an amplifier in event of a severe amplitude transient. In addition, a hard copy of the transient waveform is automatically provided for the user of the device, and a minimum amount of recording paper is required. It should also be noted that the recording apparatus will operate to provide a copy of a transient waveform even though power thereto is interrupted. These above, and other important advantages of the device will become apparent hereinafter.

In accordance with the preferred method of the invention a discrete recording medium is constantly rotated at high speed on a recording drum, and simultaneously, line voltage is monitored for detecting a predetermined transient level. Upon detecting the predetermined transient level, a light source is rapidly ignited and the light is directed onto the recording medium by optical galvanometer means to provide a record of the transient wave form. After the transient wave form has been recorded, the recording medium is ejected from the drum into a receiving means and is available for collection and review. Among the advantages of this method is that the disturbance recording is immediately available to the user without interfering with the device's normal operation and without the necessity for searching through a roll of recording paper.

BRIEF DESCRIPTION OF THE DRAWINGS

FIG. 1 is a schematic view, partially broken away, showing the preferred form of apparatus comprising the present invention;

FIG. 3 is a cross-sectional view of a preferred valve used in conjunction with the present invention; and FIG. 4 is a cross-sectional view taken generally in the plane of line 4—4 in FIG. 1.

DESCRIPTION OF THE PREFERRED EMBODIMENT

Figure 2:
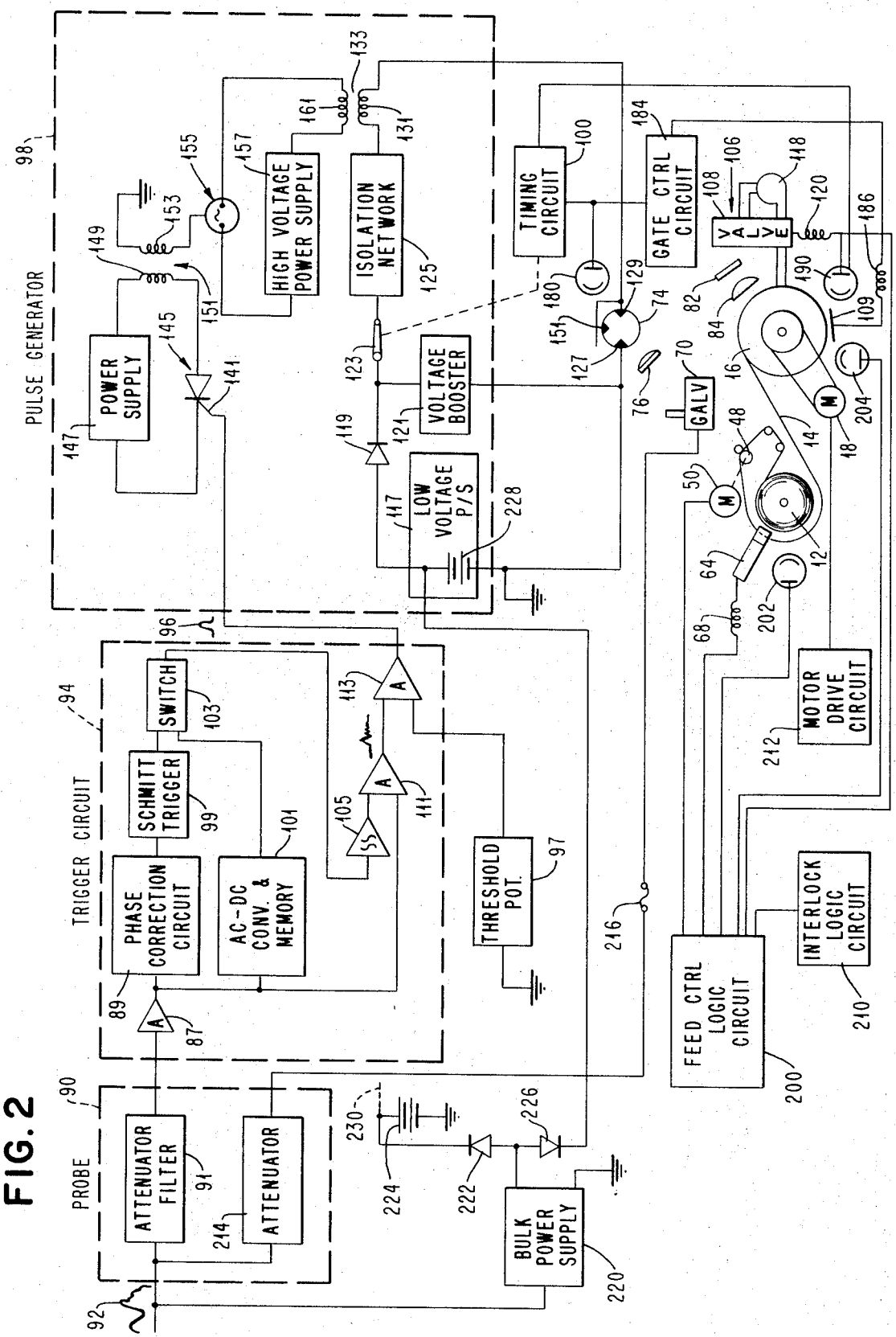
FIG. 2 is a schematic illustration of the preferred circuitry used with the present invention, also showing the relationship of the circuitry with the apparatus, in schematic fashion.

The oscillographic recording apparatus in FIG. 1, represented by reference numeral 10, is contained in a housing compartment (not shown) that also contains a continuous supply roll 12 of sensitive recording paper or chart material 14. Also contained with the housing is a pneumatic drum 16 driven by a motor 18. A drive belt 20 connects motor pulley 22 and drum pulley 24. Also mounted within the housing, and below pneumatic drum 16 is a storage hopper or chute 26 for receiving and accumulating single discrete pieces or strips of paper, as indicated by reference numeral 28, from the drum 16 after it has been recorded.

The pneumatic drum 16 carries the single strip or piece 28 of recording paper that has been cut from the continuous supply roll 12. In this regard, the drum 16 is a hollow perforated cylinder having a generally centrally located vacuum chamber or plenum 30. Connected to the plenum 30 are three vacuum ports 32, 34 and 36, each of which communicates with the exterior surface of the drum by means of the perforations (not illustrated), acting to hold the single strip of paper 28 tightly against the periphery or surface of the drum 16.

A paper feed assembly generally designated by reference numeral 40 is also mounted in the cabinet, and includes the previously mentioned supply roll 12. The paper feed assembly 40 includes rollers 42 and 44 about which paper 14 from roll 12 is threaded, a pinch roller 46 and a driven roller or capstan 48 that is connected, as illustrated in FIG. 1 in schematic form, to a drive motor 50. A paper feed loading chute generally designated by reference numeral 52 carries the paper 14 between the paper feed assembly 40 and the drum 16. As will be seen, for example in FIGS. 1 and 4, the chute 52 is generally S-shaped, and includes an outer wall 56 and inner guide members 58 and 60 defining a paper feed channel 62 in which the paper 14 travels.

A knife or cutting means 64 is part of assembly 40, and, as shown in FIGS. 1 and 2, it is situated adjacent the paper feed chute 52 for severing the paper 14 from roll 12. The knife 64 is connected to an actuating means 66 comprising, in the preferred embodiment, a solenoid member 68 for actuating the knife at preselected times in the operation of apparatus 10.

The oscillographic recording apparatus 10 also includes a galvanometer block 70 which in practice ordinarily contains a plurality of galvanometers. It will be understood that any arbitrary number of such galvanometers may be provided, and that each galvanometer has a small miror (not shown). In operation, an associated galvanometer movement that controls the mirrors acts to reflect a concentrated recording beam 72 of radiation from a source 74 onto the discrete piece of paper 28 carried on the drum 16. The source 74, in the preferred embodiment, is a so-called xenon lamp, such as the lamp designated X-76-4043, and manufactured by PEK Labs, Inc. The beam of radiant energy 72 from lamp 74 is concentrated by a collector lens, shown schematically at 76, and directed onto the galvanometer mirors in the galvanometer block 70.

The light beam 72 is reflected by the galvanometers onto a mirror 82 such as is conventional in the oscillograph art, and then through a collimating lens 84 onto a recording position on the periphery of the drum 16. In this manner an immediate image trace, corresponding to the reflections of the recording beam 72, is produced on the piece of paper 28 then on the recording drum.

By example, and not limitation, one form of recording paper 14 which has been found to be particularly useful in the practice of the present invention is that manufactured by E. I. du Pont Company and identified as its Lino-Writ 5B, Spec 29. However, other suitable recording papers may be used in conjunction with the present invention. In this regard, reference may be made to U.S. Pat. 3,167,382, which describes other suitable recording papers, and also suitable galvanometers such as may be used in conjunction with the present invention. The galvanometer actually used in the preferred embodiment was one designated by number 120B-10K, and manufactured by the Mid-Western Instruments Company.

In operation, a piece of paper 28 is carried on the periphery of drum 16 by vacuum applied to the outlet ports 32, 34 and 36, and a probe 90 is connected to a power line that is being monitored. As noted previously, the drum 16 is constantly rotating, and the piece of paper 28 thereon is unrecorded or blank. Also, at a time prior to detection of a transient signal, the xenon lamp 74 is off.

Let it be assumed that a transient condition is detected as indicated by the signal 92 shown in FIG. 2. Upon detection of the transient signal 92, a trigger circuit, 94, to be described in more detail hereinafter, supplies an output signal or trigger pulse 96 (FIG. 2) to a pulse generator 98, also to be described in more detail hereinafter. The pulse generator 98 rapidly turns on the xenon lamp 74, and a timing circuit 100 allows it to remain on for one revolution of the drum 16. The light energy from energized lamp 74 is directed by the galvanometers in galvanometer block 70 onto the moving recording medium or blank singel sheet 28, photographically recording the wave forms of transient signal 92. After a predetermined recording interval, the lamp 74 is deenergized, and the recorded piece of paper 28 is ejected or discharged from the drum 16 by an eject mechanism generally denoted by reference numeral 106 (FIG. 2). The recorded piece of paper 28 is permitted to pass through normally colsed, but now open gate 109 and into the hopper 26 for future collection. Operation of the drum 16 and eject mechanism 106 immediately subsequent to the onset of a disturbance 92 is assured by the inertia of the rotating elements (drum 16 and pumping) as will be explained more fully hereinafter.

As the recorded piece of paper 28 is ejected from the drum 16, the motor 50 is energized, driving the capstan 48 and loading a preselected length of paper 14 from supply roll 12 into the chute 52. After the preselected length of paper 14 is loaded into the chute, with its forward end adjacent the periphery the drum at the location indicated by reference numeral 110, the solenoid 68 is energized, causing the knife 64 to cut the paper. Means is provided for loading this unrecorded piece of paper 28 on the drum 16. In practice, the previous or recorded piece of paper is discharged from the drum 16 by a pneumatic valve 108 that pressurized the drum. Accordingly, restoration of the vacuum to the drum by valve 108 causes the new sheet to be grasped and wrapped around the periphery of the drum as it continues to rotate. In this manner, the oscillographic recording apparatus 10 is returned to a "ready" state, while the recording of the transient wave form 92 is available in the hopper 26.

Referring specifically now to FIG. 3, the pneumatic valve 108 is shown. Valve 108 is a four-way valve designed to switch an output plenum 112 between one of two pressure states. In this regard, a blower or pump means 118 supplies positive pressure at the inlet port 114 and vacuum at the inlet port 116. The valve 108 includes a solenoid actuator generally indicated by reference numeral 120 that actuates a slider member or stem 122 carrying valve closure members 124 and 126. In one actuated position, as shown in FIG. 3, the closure member 124 seals port 128, while in its other actuated position (not shown) valve closure member 126 closes port 130. The plunger 122 includes openings 132, 134, 136 and 138. As will be seen in FIG. 3, in the position of the stem 122 indicated therein, the openings 132 and 134 are in alignment with or communicate with openings 142 and 144 in internal plate 145, with the openings 136 and 138 being closed. With the stem 122 in its other position, the openings 136 and 138 would be in alignment with openings 146 and 148 in plate 145, and the openings 132 and 134 would then be closed. Thus, it will be appreciated that with the valve in the position indicated in FIG. 3, vacuum is applied by the pump to the output plenum 112 through aligned openings 132–142 and 134–144, and air flowing through port 130 tends to hold stem 122 in that position. In its other position, positive pressure is generated by pump 118. The pressure differential across port 130 would then cause the plenum chamber 112 to be pressurized.

The valve 108 is designed for rapid actuation; i.e., an actuation time of less than 15 milliseconds, and is particularly desirable for the present application since its rather large apertures allow free flow of a large volume of air. It will be appreciated, as shown in FIG. 2 for example, that the plenum 112 communicates with the plenum 30 in the drum, thereby applying either vacuum or positive pressure to the ports 32, 34 and 36. In this manner a sheet of paper 28 may be held on the drum by vacuum and released therefrom at a preselected point in the rotation of the drum by rapidly energizing the valve solenoid 120 and applying pressure to the sheet through ports 32, 34 and 36. In this regard, a stripper member 150 is located adjacent the drum as indicated in FIG. 1 and, when the piece of paper 28 is discharged from the drum 16 by positive pressure, the stripper will cause the paper to be directed downwardly through open slot 152 in the hopper 26. It will be appreciated, of course, that the valve 108, while particularly useful with the present invention, could be replaced by any suitable valve means that would enable either vacuum or pressure to be applied to the plenum 30, while permitting rapid switching between vacuum and pressure conditions.

The trigger circuit 94 permits the lamp 74 to be rapidly turned on, i.e., within 20 microseconds) in order to capture a record of the leading edge of the transient wave form. The trigger circuit 94 provides the trigger pulse 96 to pulse generator 98 whenever the amplitude of the monitored or probed line voltage subsequent to attenuation by probe 90 is different from the amplitude of an internally generated reference sign wave by a prdetermined value. This triggering threshold is set by a threshold potentiometer 97, and in practice was set, to values from zero to 4.25 volts D.C. (analogous to zero to 100 percent deviation from nominal line input). The actual potentiometer 97 used in the practice of the invention, was a linear multi-turn potentiometer providing threshold selection within ±3 percent. In practice, the time delay between the sensing of the leading edge of a transient wave form; i.e., a wave form having a variation greater than a preselected percentage from nominal amplitude, to generation of the trigger pulse 96 and its application to pulse generator 98 is equal to or less than 5 microseconds. Further, the ignition pulse provided by pulse generator 98 to the lamp 74 follows trigger pulse 96 by no more than 5 microseconds. This then provides a recording of substantially all of the leading edge of the transient wave form which is exceedingly helpful in its analysis.

In operation, the monitored transient signal, e.g., signal 92, is attenuated by filter 91 in probe 90 and then simultaneously processed by three essentially independent circuits in trigger circuit 94; a phase correction circuit 89 and trigger 99, a converter and memory circuit 101, and the voltage comparator or error amplifier circuit 111. The attenuated input signal is amplified by amplifier 87 to provide 4.2±0.1 volts at the output of amplifier 111 with trigger 99 disabled.

The phase correction circuit 89 provides precise phase opposition of a generated reference signal and the input signal. Subsequent to phase compensation by circuit 89, the signal is converted to a square wave by Schmitt trigger 99, which changes state approximately at the input signal zero crossings and is adjusted to have symmetrical hysteresis about zero. A D.C. analog of the peak input signal averaged over approximately one-half second is derived by the circuit 101. A suitable circuit 101 is shown and described in greater detail in IBM Technical Disclosure Bulletin, volume 7, No. 6, November 1964, at page 533, which is incorporated by reference herein.

The rsulting D.C. analog from circuit 101 is converted to a square wave in the switching circuit 103, and is converted to a reference sinusoid wave by double integrating amplifier 105. The double integrating amplifier 105 is in practice a well known voltage comparator or summing operational amplifier. The reference signal from integrating amplifier 105 is applied, together with the input signal to the aforementioned error amplifier circuit 111, which in practice may be a summing or voltage comparator closed-loop amplifier. The reference signal arm of the amplifier 111 is adjusted to provide maximum cancellation of the input signal, and the error signal at the output of amplifier 111 represents the instantaneous deviation of the input signal from the complement of the reference sinusoid. That error signal is clippd by a threshold gate in an output amplifier 113 by an amount equal to that of the externally applied threshold voltage from threshold potentiometer 97. The residue error signal (if any) is amplified and shaped by the amplifier 113, providing an output signal upon the occurrence of any residue signal. The resulting output signal is the previously mentioned pulse 96, which is applied to the pulse generator circuit 98. In summary, trigger circuit 94 oprates to detect a deviation of a sinusoidal input (or monitored) signal from its nominal wave form, and to provide an electrical output pulse whenever that deviation exceeds an adjustable threshold. The resulting error signal or pulse has an output equal in width to the time that the threshold is exceeded.

The pulse generator circuit 98 receives pulse 96 and rapidly ignites lamp 74. To do this, the lamp 74 is prepared for ignition by applying approximately 400 vlots D.C. across its diametrically opposed electrodes 127 and 129. This "boost voltage" from voltage booster source generally designated by reference numeral 121, is a conventional voltage multiplier power supply having a high source impedance (i.e., on the order of 2000 ohms). A low voltage, low source impedance, high current source 117 is connected by diode 119 in parallel with source 121. A normally closed switch 123 connects the voltage source 121 and diode 119 to an isolation network 125, that may consist of an L-C filter that will prevent ignition pulses from feeding into the boost voltage 121 and diode 119.

The voltage source 121 is operatively connected to the electrodes 127 and 129 of lamp 74 by the secondary winding 131 of transformer 133. It will be seen that ionization of the lamp 74 in response to a pulse 96 as hereinafter described provides a discharge path for the voltage source 121. The high impedance nature of the voltage source 121 causes the voltage to drop rapidly to the value provided by the low voltage power supply 117. When this potential is reached diode 119 becomes forward-biased, and conducts, allowing large values of current from power supply 117 to flow through switch 123, isolation network 125, transformer secondary 131, and subsquent lamp 74 to sustain arc conduction.

A received pulse 96 is applied to the gate 131 of an SCR 145. The SCR is connected to supply the output of a 200 volt D.C. power supply 147 to the primary winding 149 of a step-up transformer 151. The secondary 153 of transformer 151 is connected between ground and a spark gap generally denoted by reference 155. When the SCR 145 is energized, by application of pulse 96 to its gate 141, the 200 volts D.C. is applied to the primary 149 of transformer 151 and stepped up to approximately 10,000 volts. The 10,000 volts, when applied to the spark gap 155 causes it to break down, thereby permitting high voltage power supply 157 (approximately 2750 volts D.C.) to be applied to the winding 161 of transformer 133. This permits approximately 20,000 volts to be applied across electrodes 127 and 129, and 127 and 151 (by the capacitive coupling indicated in FIG. 2) of the lamp 74 causing it to be energized. In this manner, the lamp is rapidly ignited; i.e., the time delay between receipt of trigger pulse 96 by pulse generator circuit 98 and initial lamp breakdown is less than ten microseconds. The spark gap 155 used in the practice of the present invention was a "Signalite" spark gap designated TG–243.

The electric current required for operation of the circuits exemplified by the trigger circuit 94, feed control circuits 200, and interlock logic circuits 210 is derived from a conventional transformer rectifier power supply 220, the input to which may be identical with the monitored or probed line 25 indicated in FIG. 2. Immunity from line disturbances 15 achieved by using battery 224 isolated by diode 222 to store sufficient energy to complete one or more recordings upon occurrence of a power disturbance. Similarly, diode 226 allows storage of sufficient energy in battery 228 in the low voltage power supply 117 to energize the lamp 74 for one or more recordings. As will be understood, power supply 220 and battery 224 are connected by line 230 to all the electronic circuit elements that have active circuit elements requiring power, such as the elements of trigger circuit 74 and pulse generator 98, as well as circuits 100, 184, 200, 210 and 212.

The lamp 74 is permitted to remain on for one revolution of the drum. In the preferred embodiment, the drum is rotated at approximately 333 r.p.m., and by virtue of its outer diameter of eight inches, the paper speed is approximately one hundred thirty-nine inches per second. In order to turn off the lamp at the appropriate time, a conventional timing circuit 100, as previously mentioned, is activated by a photocell 180 that is located in proximity to the lamp 74. When the photocell 180 senses the ignition of the lamp 74, the timing circuit is actuated, actuating the switch 123 after approximately one hundred eighty milliseconds. At this time, the timing circuit opens the switch 123.

A gate control circuit 184 is also connected to the photocell 180 for operating the previously mentioned gate 109. This gate is shown schematically in FIG. 2, and is operated by solenoid 186 or other suitable means under control of the gate control circuit 184. The gate control circuit may conventionally be a switch such as shown in IBM Technical Disclosure Bulletin, volume 10, No. 7, December 1967, at page 1068. As explained above, the gate opens to permit recorded paper 28 to enter the slot 152 in hopper 26 after one revolution of the drum 16.

In order to remove the recorded paper from the drum 16, as explained above, the solenoid 120 is actuated. In order to actuate that solenoid, a photocell 190 is provided. This photocell is operatively connected to the solenoid 120 and situated to sense the edge of the recorded paper 28 approaching gate 109. As will be seen, the photocell 190 is also connected to the timing circuit 100 and becomes operative only upon completion of the one hundred eighty millisecond timing interval.

The previously mentioned photocell 180, and other photocells to be mentioned hereinafter are connected to amplifiers (not illustrated) in a feed control logic circuit 200. Photosensor inputs are constructed by placing a photo diode in a series with a resistor and sensing the voltage at their junction. In accordance with the operation of the invention, the circuit 200 comprises conventional logic circuits that are connected to the motor 50 that drives the capstan 48, to the solenoid 68 that controls the operation of knife 64 and to photocells 190, 202 and 204. The photocell 202 is located, in the preferred embodiment, adjacent the chute 52 and is used to sense the presence of paper in the chute. The photocell 190 is adjacent the drum, and is used to sense a gap in the recording paper 28 mounted on the drum. Photocell 204 is adjacent to gate 109 and senses obstructions of the paper path.

The photocells 202 and 204, in conjunction with conventional feed control logic circuit 200 aid in controlling the operation of apparatus 10. That is to say, the photocell 202 initiates a sequence of logic in the circuit 200 that will actuate motor 50, rotating capstan 44 thereby advancing paper 14 from roll 12 into chute 52. Subsequently, photocell 202 causes the sheet of paper 28 to be cut from the roll 12 and fed onto the drum as described above. Relative to the photocell 204, it initiates a logic sequence in circuit 200 in order to inhibit the motor 50 to ensure that the previous recording has cleared the drum 16 and gate 109 prior to loading fresh paper. Photocell 190 is associated with the sequence of events that includes operation of the knife solenoid 68, operation of the eject mechanism 106, and switching of the circuit 200 to a "ready" status when there is an indication by photocell 190 that another piece of paper 28 is loaded on the drum 16.

It will also be seen in FIG. 2 that there are interlock logic circuits and a motor drive circuit, respectively designated 210 and 212, associated with the apparatus 10. The circuits 210 comprise conventional logic means for preventing si.nultaneous operation of incompatible functions, and the motor drive circuit 212 is a conventional Triac motor controller for drum drive motor 18.

It will be noted in FIG. 2 that the probe 90 also includes a second attenuator 214 that is connected via a fuse 216 to the galvanometer block 70. This comprises the connection between the galvanometers in the block 70 and the power line being monitored. The attenuator 214 is provided to bring the input signal 92 to a voltage level compatible with the operating range of the galvanometers.

In summary, a single cycle of operation of the osillographic recording apparatus 10 is as follows. Initially, the drum 16 is constantly rotated, in the exemplification at approximately 333 r.p.m. by motor 18. A single strip of paper 28 is carried on the drum 16 by vacuum applied to the vacuum ports 32, 34 and 36. This strip of paper is, of course, unrecorded at this time. When a transient signal such as 92 is detected by probe 90, it is transmitted via attenuator 214 to the galvanometers in galvanometer block 70. Initially, the galvanometers are not transmitting light to the recording paper because the lamp 74 is not energized. However, the trigger circuit 94 provides a trigger pulse 96 to the pulse generator 98 within five microseconds of detecting the transient signal 92 if that signal is over a predetermined percentage of nominal line input, as set by threshold potentiometer 97. The trigger signal 96 provided to the pulse generator 98 causes the breakdown of the spark gap 155 which ultimately permits a high energy pulse to be applied to the lamp 74, thereby firing the lamp. As noted above, capacitive coupling of the high voltage pulse to the electrode 128, and subsequent discharge of the boost voltage 121 through the lamp 74 permits the lamp to be energized very rapidly, i.e., within twenty microseconds. When the lamp is energized, the radiant energy therefrom is concentrated into the ray 72 by collector lens 76, which ray is reflected by the galvanometers via mirror 82 and lens 84 onto the recording paper.

The trace 72 is applied to the single piece of paper 28 then on the drum 16 for one revolution of the drum, at which time the timing circuit 100 opens switch 123 shutting off the lamp 74. At the same time, the gate control circuit 200, which was activated by photocell 180 in response to energization of the lamp 74, energizes the solenoid 186 which controls the gate 109. This opens the gate 108 in the hopper 26. At substantially the same time, the photocell 190, under control of circuit 100 and upon sensing the edge of paper 24, energizes the solenoid 120 which switches pneumatic valve 108 from vacuum to the application of pressure to the ports 32, 34 and 36. This releases or discharges the recorded piece of paper 24 from the drum, and the paper is stripped therefrom by the stripper 150, sliding through the slot 152 into the hopper 26. This recorded piece of paper 28 is then ready for evaluation by the user of apparatus 10.

After the recorded piece of paper has been discharged from drum 16, photocells 202 and 204 and logic circuit 200 start the motor 50, thereby causing the capstan 48 and associated roller 46 to feed a preselected length of paper 14 from the supply roll 12 into the chute 52 to position 110 adjacent the drum. Further, the knife 64 operates to cut the paper from the supply roll 12. The solenoid 120, being no longer actuated by control circuit 184, allows pneumatic valve 108 to switch from pressure to vacuum. This acts to draw the new sheet of paper 28 onto the periphery of the drum, as the drum continues to rotate. When the new sheet of paper 28 is drawn onto the drum periphery, the photocell 190 so signals the logic circuit 200, thereby placing the recording apparatus in its "ready" state whereby future transient signals on the monitored line may be recorded.

While the invention has been particularly shown and described with reference to a preferred embodiment thereof, it will be understood by those skilled in the art that various changes in form and detail may be made therein without departing from the spirit and scope of the invention.

We claim:

1. In an oscillograph recording apparatus having a recording medium movable in a recording plane, a light source and a means for reflecting light energy from the light source onto the recording medium in response to an electric signal input, the improvement comprising:
   a main power source;
   circuit means for comparing the voltage level of the electrical signal input to a preselected voltage level;
   means operatively connected to said circuit means for rapidly igniting the light source in response to detection of a preselected variation in voltage by said circuit means whereby the reflecting means will reflect the light energy from the ignited light source onto the recording medium at said recording plane;
   means for extinguishing the light source after a preselected time interval when a predetermined quantity of the recording medium has traveled past the recording plane; and
   means for operating said main power source, said circuit means, said igniting means and said extinguishing means for at least one cycle upon failure of said main power source.

2. Apparatus for recording transitory signals on a recording medium comprising:
   means for transporting the recording medium past a recording position;
   first circuit means for detecting the transitory signals;
   a normally-off source of radiant energy;
   second circuit means operatively connected to said first circuit means and to said source of radiant energy for rapidly igniting the source of response to detection of the transitory signal by said first circuit means;
   galvanometer means for directing the radiant energy onto the recording medium at the recording position in accordance with the waveform of the transitory signal whereby substantially the entire transitory signal is recorded on said recording medium;
   a main power source; and
   means for operating said source, said first and second circuit means and said transporting means for at least one cycle upon failure of said main power source.

3. The apparatus of claim 2 wherein said transporting means includes means for retaining a strip of the recording medium having a preselected length on a continuously rotating drum; and
   means for releasing the strip of the recording medium from the recording drum at a preselected location after said source is extinguished and wherein said operating means also operates said releasing means for at least one cycle upon failure of said main power source.

4. Apparatus for recording transitory signals on a recording medium comprising:
   supply means for storing a continuous length of recording medium;
   means for transporting a discrete length of the recording medium past a recording position;
   first circuit means for detecting the transitory signals;
   a normally-off source of radiant energy;
   a second circuit means operatively connected to said first circuit means and to said source of radiant energy for rapidly igniting the source in response to detection of a transitory signal by said first circuit means;
   galvanometer means for directing the radiant energy onto the discrete length of recording medium at the recording position in accordance with the waveform of the transitory signal, whereby substantially the entire transitory signal is recorded on said recording medium;
   means for removing the discrete length of recording medium from the transporting means after it has been exposed to radiant energy at the recording position;
   means for severing another discrete length of the recording medium from the continuous length; and
   means for delivering another discrete length of recording medium to the transporting means.

5. Apparatus for recording transitory signals on a recording medium comprising:
   means for transporting the recording medium past a recording position, said transporting means including means for retaining a strip of the recording medium having a preselected length on a continuously rotating drum;
   first circuit means for detecting the transitory signals;
   a normally-off source of radiant energy;
   second circuit means operatively connected to first circuit means and to said source of radiant energy for rapidly igniting the source in response to the detection of a transitory signal by said first circuit means, said second circuit means including means for extinguishing said source of radiant energy at a predetermined time interval after it is ignited;
   galvanometer means for directing the radiant energy onto the recording medium at the recording position in accordance with the waveform of the transitory signal, whereby substantially the entire transitory signal is recorded on said recording medium;

means for releasing the strip of recording medium from the recording drum at a preselected location after said source is extinguished;

means for conveying the released strip of recording medium to a storage chamber whereby the recorded strip is available for removal from said apparatus;

a main power source; and circuit means for operating the first and second means, said source, said transporting means and said releasing means for at least one cycle upon failure of said main power source.

6. In apparatus for recording transitory signals from a signal source and having a light source and galvanometer means including a mirror for reflecting light from the light source to a recording medium in accordance with the transitory signals to be recorded, the improvement comprising:

supply means for storing a continuous length of recording medium;

means for continuously transporting a discrete piece of the recording medium past the recording position;

means for removing the discrete piece of recording medium from the transporting means after it has been exposed to light at the recording position;

means for severing another discrete piece of the recording medium from the continuous length; and means for delivering another discrete piece of recording medium to the transporting means.

7. The combination of claim 6 including hopper means for receiving the discrete pieces of recording medium from the transporting means; and means for directing the discrete pieces of recording medium from the transporting means to the hopper means.

References Cited

UNITED STATES PATENTS

| | | | |
|---|---|---|---|
| 1,798,689 | 3/1931 | Legg | 346—109 |
| 2,082,624 | 6/1937 | Hagenguth et al. | 346—109 X |
| 2,394,577 | 2/1946 | Wise | 271—3 |

JOSEPH W. HARTARY, Primary Examiner

U.S. Cl. X.R.

346—24, 109, 134; 324—113